April 17, 1951 R. F. FOSTER 2,549,444
SWITCHING TRANSIENT NOISE SUPPRESSION SYSTEM FOR
COMBINATION RADIO AND TELEVISION RECEIVERS
Filed Dec. 17, 1947
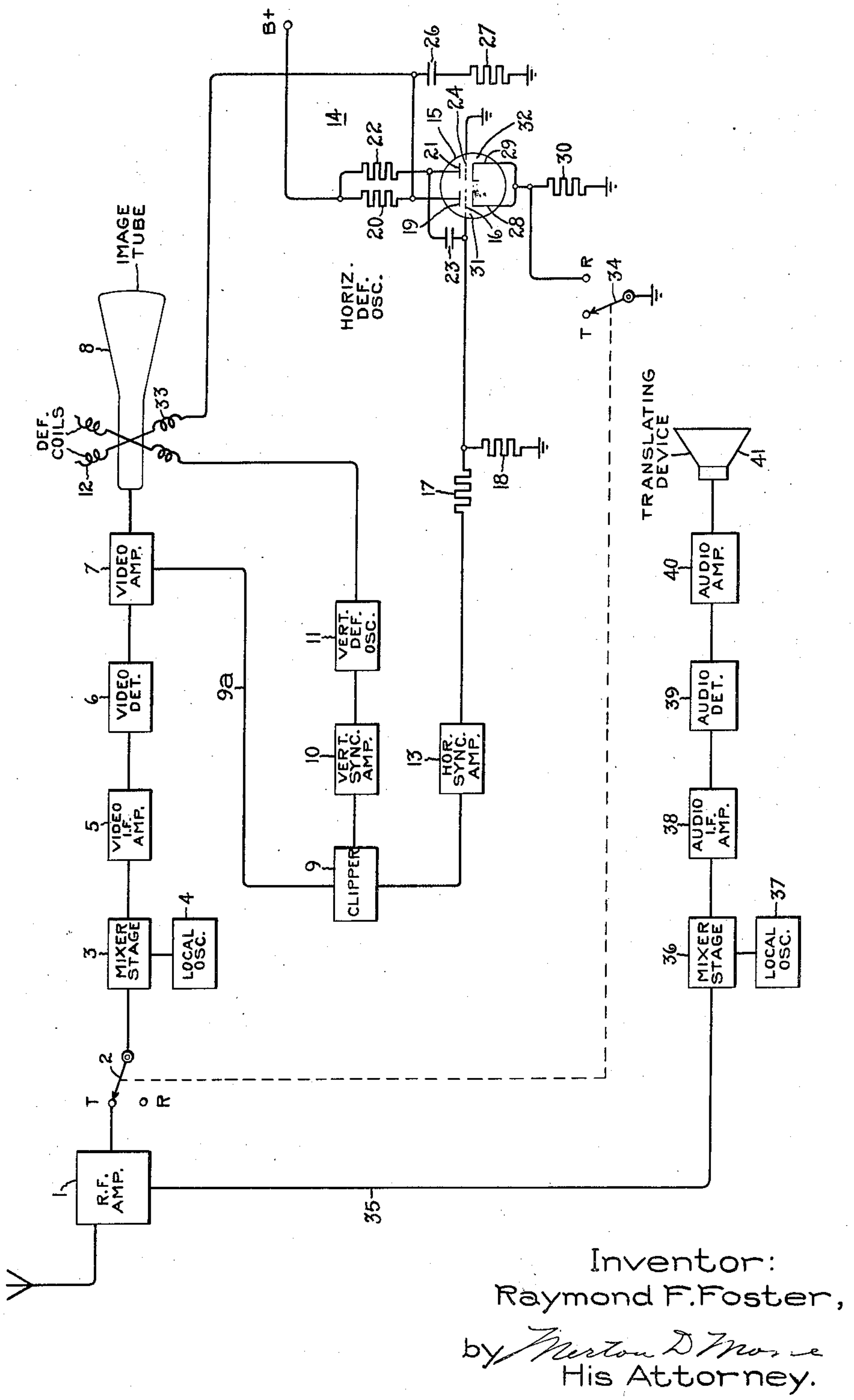
Inventor:
Raymond F. Foster,
by Merton D. Moore
His Attorney.

Patented Apr. 17, 1951 2,549,444

UNITED STATES PATENT OFFICE 2,549,444

SWITCHING TRANSIENT NOISE SUPPRESSION SYSTEM FOR COMBINATION RADIO AND TELEVISION RECEIVERS

Raymond F. Foster, Stratford, Conn., assignor to General Electric Company, a corporation of New York Application December 17, 1947, Serial No. 792,118

5 Claims. (Cl. 178—5.8)

This invention relates to receiving systems of the combination television and radio receiver type, and more particularly to means in such receivers for suppressing undesirable noise in the radio receiver section when the system is switched thereto from the television section.

There is included in the television section of the above-mentioned systems a horizontal deflection oscillator and a cathode ray image tube. This oscillator is synchronized to signals transmitting concomitantly with the video signals. In response to these synchronizing signals the oscillator generates a deflection potential which is applied to the horizontal deflection coils of the above-mentioned image tube, causing the cathode ray beam in this tube to sweep the fluorescent end wall, in a horizontal direction and at a predetermined rate.

When the combination system is switched from the television section to the radio section, oscillations from the above-mentioned deflection oscillator do not normally decay instantaneously. During the decay time these oscillations have a waveform and frequency such that harmonics of appreciable amplitude are intercepted in the broadcast band of the radio section. These harmonics heterodyne with the signals normally appearing in the broadcast band and gives rise to harsh objectionable noises in the radio receiver translating device.

It is an object of this invention to provide means in a combination television and radio receiver whereby the change over from one type of reception to another may be accomplished silently and without the generation of undesired signals in the output of the radio section of the receiver.

A further object of this invention is to provide means in such a receiver, whereby, in switching the receiver from television to radio reception, the horizontal deflection oscillator is instantly suppressed and the decay time of this oscillator is reduced to a minimum.

The features of this invention which are believed to be new are set forth with particularity in the appended claims. The invention itself however, together with further objects and advantages thereof may best be understood by reference to the accompanying drawing wherein the single figure shows a portion of a television receiver circuit embodying the invention.

Referring now to the figure which shows a particular schematic representation of a combination television and radio receiving system incorporating the present invention, a radio frequency amplifier designated as 1 acts as a common stage for television and radio reception. During television reception this stage intercepts video and audio signals and by switching and tuning means included therein, radio signals may be intercepted and amplified by this stage when radio reception is desired.

For television reception a switch 2 is set to contact T as shown. Audio and video signals are amplified in the radio frequency amplifier 1 and then applied to the usual mixer stage 3 where these signals are heterodyned with oscillations from a local oscillator 4. The resulting intermediate frequency signals are amplified in one or more video intermediate frequency amplifier stages 5 and demodulated in a video detector stage 6. The demodulated signals are amplified in further video amplifier stages 7 and impressed on the control electrode of a receiver image tube 8 in the usual manner.

As previously described, synchronizing signals are transmitted concurrently with the video signals. These signals are applied to a clipper stage 9 by way of lead 9A, where they are separated from the video signals. The vertical synchronizing signals are separated from the horizontal synchronizing signals and amplifying stage 10 and the output from this stage is used to synchronize a vertical deflection oscillator 11 which provides the deflection potential for the vertical deflection coils 12.

Oscillator synchronizing signals are separated from the vertical synchronizing signals and amplified in amplifier stage 13 and the amplified signals are utilized to synchronize a horizontal deflection oscillator shown generally as 14. The deflection oscillator 14 may be of any general type and in the example shown comprises a pair of triodes enclosed in a common envelope 15. Signals from amplifier 13 are impressed on control electrode 16 through resistor 17 and by means of grid leak resistor 18. Anode 19 is connected to a source of unidirectional potential B+ through a resistor 20, and anode 21 is connected to this source through resistor 22. Anode 21 is also coupled to the control electrode 16 through a capacitor 23, and control electrode 24 is connected to ground. Capacitor 26 is charged from source B+ through the aforementioned resistor 20 and a further resistor 27 connecting this capacitor to ground. Cathodes 28 and 29 are coupled to ground through an impedance 30.

The action of the above described oscillator is well known. When the left hand triode 31 of device 15 is nonconducting, the right hand triode 32 is conducting and capacitor 26 charges through resistors 20 and 27. This charging continues until triode 31 becomes conductive due to a control signal on electrode 16 or to the rise in anode potential. When triode 31 conducts current through the impedance 30 causes cathodes 28 and 29 to become positively biased and the current through triode 32 decreases causing an increase in potential on anode 21. This increase in anode potential of triode 32 is impressed on the control electrode 16 through capacitor 23 further increasing the conductivity of triode 31. The action is cumulative and capacitor 26 rapidly discharges. Capacitor 23, however, also discharges and the positive bias on control electrode 16 decreases and in time the current in the triode 31 also decreases. This decrease in current in the triode 31 also decreases with positive bias on cathode 29 due to impedance 30 and hence triode 32 becomes slightly conductive. This places a negative bias on control electrode 16 and by cumulative action, triode 31 rapidly returns to its nonconductive state, which in turn, due to the action of impedance 30, returns the triode 32 to its conductive state. In this manner, the well known saw-tooth form of deflection potential may be taken from anode 19 and applied to the horizontal deflection coils 33 of the image tube 8.

It can be seen from the above description that the impedance 30 is essential for the operation of deflection oscillator 14. When this impedance is short circuited, cathodes 28 and 29 are established at ground potential and the output of this oscillator is immediately suppressed. This invention contemplates, therefore, the provision of a switch 34 mechanically coupled to switch 2 for unicontrol operation. When it is desired to receive radio signals, these switches are moved to the contact marked R. Switch 2 disconnects the television section from the radio amplifier 1, and switch 34 causes oscillations from the deflection oscillator 14 to be immediately suppressed, thus assuring that no irritating signal noise is produced in the radio receiver translating device.

Signals from radio frequency amplifier stage 1 are applied to the radio section of the combination receiving system by way of lead 35. This section is utilized to receive the audio signals of the television program when switches 2 and 34 are in position T, and to receive radio signals when the above switches are in position R, assuming that the further necessary tuning and switching adjustments have been made.

The radio section is conventional and comprises a mixer stage 36 wherein the received signals are heterodyned with oscillations from oscillator stage 37, the usual intermediate frequency amplifier stage 38, and detector stage 39 for demodulating the radio signals. The demodulated signals are then emplified in one or more audio amplifier stages 40 and reproduced in a signal translating device 41.

It has been found that with the present arrangement, switching from television reception to radio reception may be silently accomplished, unaccompanied by undesirable noise signals in device 41.

While a preferred embodiment of the invention has been shown, it will of course be understood that various modifications may be made without departing from the invention. The appended claims are, therefore, intended to cover any such modifications within the true spirit and scope of the invention.

What I claim as new and desire to secure by Letters Patent of the United States is:

1. In a combination radio and television receiving system, a first switching means for selectively conditioning said receiver for television and radio operation, a cathode ray tube deflection oscillator of the cathode-coupled type comprising a pair of electron discharge devices having a common cathode circuit, means for regeneratively coupling said devices for generation of oscillations comprising a coupling impedance included in said cathode circuit, second switching means connected in shunt therewith for short-circuiting said impedance to stop said oscillations and to suppress transient oscillations from said oscillator when operation of said oscillator is discontinued, and means for actuating said second switching means to short-circuiting position when said system is conditioned for radio reception.

2. In a combination radio and television receiver adapted to be selectively conditioned for radio and television reception, a cathode ray deflection system, a pair of electron discharge devices having a common cathode circuit, means for regeneratively coupling said devices for operation as a multivibrator, said means comprising a coupling impedance in said cathode circuit, a source of synchronizing signals, and an output circuit, means for supplying deflection potentials from said multivibrator to said output circuit in response to synchronizing signals from said source, first switching means for arresting said synchronizing signals and for conditioning said system for radio reception, and means for blocking said multivibrator and for suppressing transient oscillations in said multivibrator when said synchronizing signals are arrested, said last-mentioned means comprising second switching means mechanically coupled to said arresting means for concurrently short-circuiting said impedance.

3. In a combination radio and television receiver adapted to be selectively conditioned for radio and television reception, a cathode ray tube deflection oscillator of the cathode-coupled type comprising a pair of electron discharge devices having a common cathode circuit and adapted to be controlled by received synchronizing signals, switching means for energizing said system for radio operation when actuated to an open position and for television reception when actuated to a closed position, said means causing said synchronizing signals to be impressed on said oscillator when said means is in a closed position, means for regeneratively coupling said devices together for generation of deflection control waves, said coupling means comprising an impedance in said common cathode circuit, and further switching means connected in shunt with said impedance and uni-controlled with said first switching means for short-circuiting said impedance means when said first-mentioned switching means is actuated to an open position.

4. In a combination radio and television receiving system, a cathode ray image tube, switching means for energizing said system for radio operation when actuated to an open position and for television reception when actuated to a closed position, said means impressing video signals on said receiving system when said means is in a closed position, a deflection oscillator associated with said image tube, said oscillator including a pair of electron discharge devices having a common cathode circuit, means for regeneratively coupling said devices for generation of oscillations comprising a coupling impedance in said common cathode circuit, and further switching means connected in shunt with said impedance and mechanically coupled to said first-mentioned switching means for short-circuiting said impedance means when said first-mentioned switching means is actuated to an open position.

5. In a combination radio and television receiving system, switching means for selectively conditioning said receiving system for television and radio reception, a television section in said receiving section including a cathode ray image tube and a deflection oscillator associated with said tube, said oscillator comprising a pair of electron discharge devices having a common cathode circuit, means for regeneratively coupling said devices for generation of oscillations comprising a coupling impedance in said common cathode circuit, said system including a circuit for radio reception undesirably coupled to the circuit of said oscillator, and further switching means connected in shunt with said impedance means and mechanically coupled to said first-mentioned switching means, for short-circuiting said impedance when said receiving system is switched to a position for radio reception to prevent coupling of undesired transient voltages into said radio circuit.

RAYMOND F. FOSTER.

REFERENCES CITED

The following references are of record in the file of this patent:

UNITED STATES PATENTS

| Number | Name | Date |
|---|---|---|
| 1,987,686 | Kwartin | Jan. 15, 1935 |
| 2,033,948 | Lowell | Mar. 17, 1936 |
| 2,165,025 | Baldwin | July 4, 1939 |
| 2,186,455 | Goldmark | Jan. 9, 1940 |
| 2,222,761 | Beeyer | Mar 26, 1940 |
| 2,338,395 | Bartelink | Jan. 5, 1944 |
| 2,355,363 | Christaldi | Aug. 8, 1944 |
| 2,406,096 | Morrison | Aug. 20, 1946 |
| 2,416,304 | Grieg | Feb. 25, 1947 |
| 2,431,766 | Miller | Dec. 2, 1947 |

FOREIGN PATENTS

| Number | Country | Date |
|---|---|---|
| 469,289 | Great Britain | July 22, 1937 |

OTHER REFERENCES

Philco Service Television Model 48-1000, pages 7, 31, 32, published in 1948.